3,293,999
MATERIAL AND METHOD FOR PAVEMENT CONSTRUCTION
John P. Gnaedinger, 1441 Linden Ave., Highland Park, Ill. 60035
No Drawing. Filed Dec. 2, 1965, Ser. No. 511,235
5 Claims. (Cl. 94—7)

This application is a continuation-in-part of applicant's copending application Serial No. 229,968, filed October 11, 1962, and now abandoned.

This invention relates to an improved material for use in a pavement construction and to methods for preparing and using this material. The invention is particularly directed to improved compositions for use as a base course in constructions such as highways, streets, runways, parking lots and the like.

It has long been recognized that in the design of pavement constructions which carry traffic such as trucks and cars, there are three essential elements involved. These elements include the subgrade or supporting soil which may comprise the natural deposit or which may have been provided as man-made fill. Located above the subgrade, there is provided a base course which will transmit the pressures exerted by the vehicles to the subgrade. Located above the base course, there is situated the surface course which is in direct contact with the vehicles.

Where concrete pavement is employed, the operation of the base course is not particularly critical since the concrete is quite rigid, and, therefore, shearing stresses in the base course are small. However, in the case of flexible pavement, the base course functions to transmit relatively high stresses to the subgrade and, therefore, the nature of the base course is quite critical where flexible pavement constructions are involved.

Some current construction practices involve the use of crushed stone or other granular materials for base courses; however, these aggregates suffer from lack of cohesion, are subject to densification under traffic conditions, and have relatively low shearing strengths under concentrated loads. A more recent advance involves the use of a mixture of lime, an aggregate, such as crushed stone, soil or slag, and flyash, and these recently developed mixtures have been satisfactory from most standpoints. However, materials employed in these compositions are expensive either due to their scarcity or to the expense of producing and handling them, and advantages can be gained where materials are less expensive.

It is an object of this invention to provide an improved material for pavement constructions which is economical to produce and which can be employed in an efficient fashion.

It is an additional object of this invention to provide a material which is particularly suitable for use as the base course provided beneath flexible pavement constructions for the reason that the material possesses the requisite strength for distributing loads on the pavement.

It is a further object of this invention to provide a material for use as a base course in flexible pavement constructions which is economical to produce, which comprises a minimum of relatively inexpensive ingredients and which can be handled and utilized in a highly efficient manner.

These and other objects of this invention will appear hereinafter and it will be understood that the specific examples hereinafter set forth are provided for purposes of illustration and not by way of limitation.

In accordance with this invention, a material for use as a base course in a pavement construction is provided by mixing from 2 to 10% by weight lime with incinerator ash. The incinerator ash utilized in the novel material comprises the product prepared by burning refuse in a rotary kiln furnace at a temperature between about 1600° F. and 2000° F. The ash is of the type which will pass through a ¾ inch to one inch screen prior to use in order to remove large metal pieces.

The incinerator ash utilized in the material of this invention must be characterized by certain other specific properties. The ash must comprise the product which results from the burning of miscellaneous refuse and garbage in a slowly rotating kiln-type furnace preferably at a temperature of about 1800° F. After burning, the product is washed through a ¾ to one inch screen whereby large pieces of metal and other large fragments are removed. In the resulting product, about 60 to 90 percent passes through a No. 4 (⅜ inch) screen, 10 to 30 percent passes through a No. 30 screen, from two to 12 percent passes through a 100-mesh screen, and from 1.5 to 8 percent passes through a 200-mesh screen. The specific incinerator ash employed also must have a carbon content whereby the ash will be susceptible to the reaction which characterizes the instant invention. The carbon content must be sufficient to provide an amount of at least 10 percent by weight carbon in the ash-lime mixture employed for forming the base course. An amount of at least 15 percent by weight carbon, measured by determining the loss of weight on ignition of the ash, is preferably contained in the incinerator ash before mixture with the lime.

A typical analysis of incinerator ash produced in accordance with the above technique and suitable for the material of this invention is as follows:

*Table I*

| | | |
|---|---|---|
| Silica ($SiO_2$) | percent by weight | 55 |
| Alumina ($Al_2O_3$) | do | 9 |
| Iron oxide ($Fe_2O_3$) | do | 9 |
| Calcium oxide (CaO) | do | 10 |
| Magnesium oxide (MgO) | do | 2 |
| Soluble salts | do | 1.2 |
| Total sulfates | do | 15 |
| Loss on ignition [1] | do | 15 |
| Specific gravity | | 2.57 |

[1] "Loss on Ignition" indicates the original carbon content since the reduction in weight after ignition corresponds to the amount of carbon which reacted and passed off in gaseous form during the ignition.

The incinerator ash having the characteristics necessary for the practice of the instant invention distinguishes in certain material respects from the flyash employed in the prior art. Incinerator ash distinguishes in size characteristics since flyash, in order to be suitable for the reaction described in the prior art, must be an extremely fine material. This reaction, referred to as a pozzolanic reaction, requires an ash, 98% of which will pass a No. 30 screen and 70% of which will pass a No. 200 screen.

Flyash is also obtained from a completely different source, namely, as the finely divided residue resulting from the combustion of coal. This residue is referred to as a pozzolan which is a siliceous or alumino-siliceous material. The above noted specifications for flyash are found in ASTM Designation: C379–56T.

As will appear from the following description, incinerator ash, to be suitable for the instant invention, must be capable of undergoing a reaction which is entirely different from the pozzolanic reaction which characterizes the use of flyash. It is for this reason that the incinerator ash of this invention must have the foregoing characteristics since ashes recovered from an incinerator will not achieve the reaction of this invention unless they possesss these characteristics. The most important characteristic of the incinerator ash comprises the carbon content. The necessity for a relatively large amount of carbon distinguishes from a flyash system particularly since the carbon content is actually suppressed in such systems. As will be noted hereinafter, the reaction of this invention comprises a carbonation reaction, and such a reaction does not take place in the case of flyash, which material is actually the residue obtained from the combustion of powdered coal, this residue consisting of burned shale.

The lime employed in the materials of this invention in an amount up to about 10% by weight is selected from the various well-known hydrated limes. Quick lime also produces satisfactory results although it is usually avoided due to the health hazards attendant the use of this material in actual practice. Flue lime, containing approximately 40% calcium oxide, can also be used in increased amounts whereby the desired lime content will be provided.

A preferred lime comprises monohydrated dolomitic lime which consists of a mixture of $Ca(OH)_2$ and $MgO$. Fully hydrated lime is also contemplated as suitable for use in the inventive materials.

Various experiments have been conducted which illustrate the characteristics of the ash lime mixture of this invention and which illustrate the advantageous properties thereof. These experiments indicate that the density of the mixture should be at least 85% of the density determined by ASTM Method D-1557-58T. To achieve this density, placement at a water content between 10 and 25% by weight and preferably between 18 and 23% by weight is recommended. Laboratory and field tests were conducted on a mixture consisting of 5% lime and 95% incinerator ash in order to determine the compressive strength thereof. The following table illustrates the results of these tests.

*Table II*

At 28 days, 5% lime, 95% ash (density—86 p.c.f.):

| | Lbs. per sq. inch |
|---|---|
| Laboratory | 296 |
| Field | 306 |
| Laboratory (density 112 p.c.f.) | 700 |

Swelling characteristics at maximum density: Negative.

In the construction of pavement with a base course in accordance with this invention, the incinerator ash is first prepared in accordance with the above described technique. This ash is then mixed with the lime in a mixing plant or in a truck mixer, or it is mixed in place by discing and blading, or it can be mixed by any other method which assures a uniform distribution of the lime in the incinerator ash. Moisture is added so that the total moisture at the time of compaction is approximately at the optimum point as determined by ASTM Method D-1557-58T.

After the moisture and lime have been uniformly mixed into the volume of incinerator waste, the mixture is rolled by vibratory or other compaction equipment to a density of about 95% as determined by the above noted ASTM method. The surface of the compacted base course can then be coated after placement with a bituminous primer material to minimize evaporation, to cure the material, and to prevent infiltration of rain which might otherwise leach the surface.

After application of the material, evolution of gases has been noted. This phenomena necessitates a delay in providing final surfacing as with asphaltic concrete or other flexible surfacing. If the final surfacing was applied immediately, the evolving gas would form bursts in the surface.

The evolving gas is believed to be methane, and the existence of this gas verifies the identity of the carbonation reaction referred to. This distinguishes from the reaction known to take place when flyash is employed. It has been found that a delay of about three days is necessary in order to achieve sufficient evolution of the gases whereby bursts in the surface will not be formed.

Although the reaction continues for an extended period, the amount of evolving gases after about three days is relatively small and the pressure increases are not great enough to damage the final surface. The material of this invention will not achieve its full strength until at least one month has passed and traffic should be limited over the pavement for a week or more after placement to prevent a breakup of the material before settling has been completed.

The mechanism which results in the achievement of strength in the mixture of this invention is a carbonation reaction between the finely divided carbon in the ash and the lime, the reaction forming $CaCO_3$, and cementing the coarser particles in the ash. This distinguishes from a pozzolanic action which comprises a reaction of the siliceous and alumino-siliceous constituents of the ash with the hydroxides in the lime to form compounds possessing cementitious properties.

The reaction of the invention is slow, extending over a period of several months, and, therefore, the final strength of the base course will be appreciably higher than the strength after about one month. As above indicated, however, traffic can be allowed on a pavement construction which utilizes this invention before full strength has been achieved because the compacted base course can support appreciable loads for a significant time before full strength is achieved.

In the application of the incinerator ash-lime mixture of this invention as a base course, the density of the base course which should be specified will depend upon the character of the subgrade and upon the expected load and frequency of traffic. It is contemplated that conventional formulas which are available for the design of installations in parking lots, streets, highways, runways and the like will be utilized in determining the details of the base course construction.

As explained, it has been found desirable to apply a surface course over the base course of this invention as the base course will then more readily withstand the pressure and abrasion occasioned by the passage of vehicles thereover. Following common pavement construction practices, the incinerator ash-lime base course can be primed through the application of a cut-back asphaltic material, using either a medium curing or rapid curing liquid asphalt. About 0.1 to 0.2 gallon per square yard of this liquid asphalt is employed. After a curing period of at least 24 hours, a wearing course, consisting of 1 to 3 inches is provided as the flexible pavement. The thickness of this wearing course will depend on the expected traffic load on the construction.

In some instances, the surface of the base course of this invention may be sealed by the application of a bituminous surface treatment which consists in the alternate application of bituminous material and aggregate. Again, the use of a seal coat of this nature will depend on the traffic load anticipated for a particular location.

This invention has the advantage over materials using flyash as a base course in that no crushed stone, soil, or slag is needed as an additive. The incinerator ash serves both as aggregate and as the chemical material which reacts with the lime.

This invention offers a further advantage in that the incinerator ash, which normally must be disposed of at a considerable cost to dump sites frequently located many miles from the incinerator plant, can now have an economic value. There is thus produced a high quality base course at a significantly lower cost than the pozzolanic base courses, and, in most cases at a lower cost than crushed stone bases.

The above description is believed to illustrate the improvements which can be achieved in the formation of flexible pavement constructions. It is also to be understood, however, that these compositions are highly suitable for use as a base course for concrete pavement and also find utility without a surface course and these applications are therefore contemplated.

It will further be understood that various changes and modifications can be made in the above described invention which provide the characteristics of this invention without departing from the spirit thereof particularly as defined in the following claims.

That which is claimed is:

1. In a pavement construction which includes a subgrade, a base course disposed thereon, and a surface course, the improvement wherein said base course consists essentially of the reaction product obtained from a mixture having a water content along with a solids content consisting essentially of from 2 to 10% by weight lime and the balance incinerator ash, said incinerator ash comprising the product achieved by burning refuse in a rotary kiln at a temperature between 1600 and 2000° F., said refuse having a high carbon content to the extent that said ash contains sufficient carbon to provide at least 10% by weight carbon in the ash-lime combination comprising said solids content, and wherein 100% of the incinerator ash employed will pass through a ¾ inch to 1 inch screen, 60 to 90% will pass through a No. 4 screen, 10 to 30% will pass through a No. 30 screen, 2 to 12% will pass through a 100-mesh screen, and 1.5 to 8 percent will pass through a 200-mesh screen, said base course comprising the reaction product resulting from a carbonation reaction between said lime and said carbon.

2. A pavement construction in accordance with claim 1 wherein the incinerator ash mixed with said lime comprises at least 15% by weight carbon.

3. In a method for the formation of a pavement construction wherein a base course is disposed in overlying relationship with respect to a subgrade, the improvement comprising a method for forming said base course, said method comprising the steps of forming a mixture characterized by a water content by mixing incinerator ash with from 2 to 10% by weight lime in the presence of moisture and disposing said mixture over said subgrade, said incinerator ash comprising the product achieved by burning refuse in a rotary kiln at a temperature between 1600 and 2000° F., said refuse having a high carbon content to the extent that said ash contains sufficient carbon to provide at least 10% by weight carbon in the ash-lime combination and wherein the incinerator ash recovered from said kiln is sifted prior to use through a ¾ inch to 1 inch screen, the resulting ash having a typical particle size distribution wherein 60 to 90% of the ash passes through a No. 4 screen, 10 to 30% of the ash passes through a No. 30 screen, 2 to 12% of the ash passes through a 100-mesh screen, and 1.5 to 8% will pass through a 200-mesh screen, and wherein the base course formed from said mixture is permitted to stand for a period prior to actual use, and wherein a carbonation reaction between the lime and carbon content of said ash takes place during such period.

4. A method in accordance with claim 3 wherein the incinerator ash mixed with said lime comprises at least 15% by weight carbon.

5. A method in accordance with claim 3 including the step of applying a flexible surface over said base course, and wherein application of said final surface is delayed to permit evolution of gases formed during said carbonation reaction.

References Cited by the Examiner

UNITED STATES PATENTS

| | | | |
|---|---|---|---|
| 2,698,252 | 12/1954 | Havelin | 94—25 |
| 2,937,581 | 5/1960 | Havelin | 94—25 X |
| 2,942,993 | 6/1960 | Handy | 94—25 |
| 3,076,717 | 2/1963 | Minnick | 106—118 |

OTHER REFERENCES

Civil Engineering, September 1953, pages 38, 39.

JACOB L. NACKENOFF, *Primary Examiner.*

CHARLES E. O'CONNELL, *Examiner.*